United States Patent [19]

Barton et al.

[11] Patent Number: 4,576,895

[45] Date of Patent: Mar. 18, 1986

[54] OPTICAL RECORDING BY ENERGY-INDUCED FRACTIONATION AND HOMOGENIZATION

[75] Inventors: Roger W. Barton, Los Altos; Hans J. Coufal, San Jose; Victor B. Jipson, San Jose; Wen Y. Lee, San Jose, all of Calif.

[73] Assignee: International Business Machines Corporation, Armonk, N.Y.

[21] Appl. No.: 621,410

[22] Filed: Jun. 18, 1984

[51] Int. Cl.[4] .................................................. G03C 1/94
[52] U.S. Cl. .................................... 430/270; 430/330; 430/495; 430/945
[58] Field of Search ............... 430/495, 496, 270, 330, 430/945

[56] References Cited

U.S. PATENT DOCUMENTS

| | | | |
|---|---|---|---|
| 3,530,441 | 9/1970 | Ovshinsky | 340/173 |
| 3,971,874 | 7/1976 | Ohta et al. | 428/432 |
| 4,091,171 | 5/1978 | Ohta et al. | 428/539 |
| 4,188,214 | 2/1980 | Kido et al. | 430/495 |
| 4,278,734 | 7/1981 | Ohta et al. | 428/432 |
| 4,293,634 | 10/1981 | Monosov | 430/330 |
| 4,383,261 | 5/1983 | Goldberg | 430/330 |
| 4,388,400 | 6/1983 | Tabei et al. | 430/495 |
| 4,499,178 | 2/1985 | Wada et al. | 430/495 |

OTHER PUBLICATIONS

"Laser Writing on Metal-Silicon Bilayers for Optical Storage" K. Y. Ahn et al., Journal of Applied Physics, vol. 53, pp. 3777–3783, 1982.

Primary Examiner—J. Travis Brown
Attorney, Agent, or Firm—Joseph E. Kieninger; Henry E. Otto, Jr.

[57] ABSTRACT

A method of and structure for optical recording by energy-induced homogenization or fractionation is disclosed. When the method involves fractionation, a film is provided that contains a homogeneous mixture of a matrix material and an incident energy absorbing material. A spot on the film is treated with sufficient energy in the form of electric fields, radiation or heat, or combinations thereof to effect fractionation and/or homogenization of the film which will undergo further physical state transition only under treatment with additional energy. In a preferred embodiment, the fractionation is effected by laser radiation. The laser irradiated spot becomes inhomogeneous and can be detected by the resulting changes in its optical properties. When the method involves homogenization, a film is provided that contains a inhomogeneous mixture. The energy treated spot in this case becomes homogeneous without undergoing a phase transition between the amorphous and crystalline phases. Numerous combinations of fractionation and homogenization can result in the writing and erasing of information in a storage device.

13 Claims, 11 Drawing Figures

HOMOGENEOUS

INHOMOGENEOUS

OPTICAL RECORDING BY ENERGY-INDUCED FRACTIONATION AND HOMOGENIZATION

DESCRIPTION

1. Technical Field

This invention relates to optical storage and more particularly to a method and structure for optical recording by energy-induced homogenization or fractionation.

2. Background Art

The patent to Ovshinsky, U.S. Pat. No. 3,530,441, describes the use of transition amorphous-crystalline states in a semiconductor material to store information data. An example of a memory semiconductor material contains about 85% tellurium and 15% germanium in atomic percent with inclusions of some oxygen and/or sulfur. The state of these amorphous materials can be changed by applying electrical, optical or thermal energy thereto. In one state such material has a so-called non-crystalline or amorphous bulk structure which has a low optical density. In the other state the material has a crystalline structure which has a relatively high optical density.

The patent to Ohta et al, U.S. Pat. No. 3,971,874, describes the use of the transition non-crystalline (amorphous)-crystalline state in a tellurium oxide film. Again, the noncrystalline structure has a low optical density and the crystalline structure has a relatively high optical density. Ohta et al U.S. Pat. No. 4,091,171 describes a transition non-crystalline (amorphous)-crystalline state in Ge,Sn,Sb,Tl,Bi and Mo sub-oxide. Ohta et al U.S. Pat. No. 4,278,734 covers transition non-crystalline (amorphous)-crystalline state in metal or semi-metal sub-oxide. In all of the Ohta et al patents, the change in optical density occurs when the structure changes from non-crystalline (amorphous) to a crystalline structure.

Ahn et al, Journal of Applied Physics, Vol. 53, p3777, 1982, describes the use of an irreversible chemical reaction between two components into one compound. The optical density of both states is different. The transition is effected by heating the sample with a short laser pulse.

There have been some problems with information storage materials heretofore proposed that, like those described in the above patents, utilize the optical density change when there is a change between the non-crystalline structure and the crystalline structure. The primary problem with this type of optical storage system is that they have post-exposure development. Post-exposure development means that the reflectivity continues to change over a period of time of up to ten minutes after the laser strikes the material depending on the particular material used. This means that it takes too long before one can achieve full contrast in the optical density. In computer terminology, the time to read - verify a bit after writing is too long. With the Ahn type systems the chemical reaction cannot be reversed, i.e. they are non-erasable.

SUMMARY OF THE INVENTION

It is a primary object of this invention to provide an improved method and a structure for optical recording.

It is another object of this invention to provide an optical storage method and structure that has a short post-exposure development time.

These and other objects are accomplished with a method of and structure for optical recording by energy-induced homogenization or fractionation. When the method involves fractionation, a film is provided that contains a homogeneous mixture of a matrix material and an incident energy absorbing material. Non-limiting examples of matrix materials include $SiO_2$, $TeO_2$, $GeO_2$, $MoO_2$, $Sb_2O_3$, $Bi_2O_3$, $In_2O_3$, $TbO$, $(CF_4)_n$, Se and mixtures thereof. Non-limiting examples of absorbers are Au, Ag, Pt, Pd, Ti, Cr, Cu, Te, Ge, Mn, Sb, Bi, Sn, In, Pb and mixtures thereof. A spot on the film is treated with sufficient energy in the form of electric fields, radiation or heat, or combinations thereof to effect fractionation of the film. In a preferred embodiment the fractionation is effected by laser radiation and the reaction is complete in times shorter than a millisecond. The laser irradiated spot becomes inhomogeneous and can be detected by the resulting changes in its optical properties. When the method involves homogenization, a film is provided that contains an inhomogeneous mixture. The irradiated spot in this case becomes homogeneous and can be detected by resulting changes in its optical properties. Numerous combinations of fractionation and homogenization can result in the writing and erasing of information in a storage device. By proper selection of matrix and/or absorber material it is possible to suppress any accompanying changes of state in the film, e.g. crystalline to amorphous transitions, or cause them to occur in the same time scale as the fractionation/homogenization reaction. This eliminates the post-exposure development problem, the film being stable in either fractionated or homogenized state until or unless radiation is applied to reverse the original reaction. No physical state transformation will occur without the application of additional energy.

Other objects of this invention will be apparent from the following detailed description, reference being made to the following drawings in which specific embodiments of the invention are shown.

DECRIPTION OF THE PREFERRED EMBODIMENT

Figure 1A:
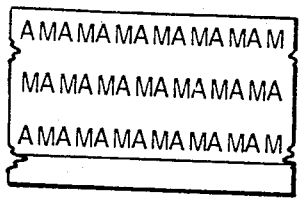
FIGS. 1A and 1B illustrate homogeneous mixtures.
Figure 1B:
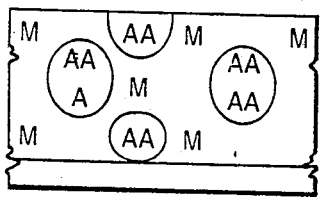
Figure 2A:
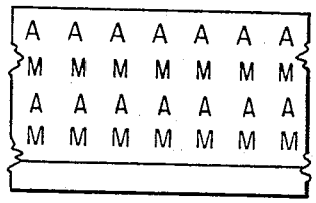
FIGS. 2A and 2B illustrate inhomogeneous mixtures.
Figure 2B:
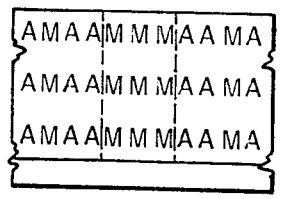

FIG. 1 illustrates the concept of a homogeneous mixture. Homogeneous can mean, as in FIG. 1A, that the two elements, matrix M and absorber A, are mixed on an atomic scale. A more coarse distribution, as in FIG. 1B, however, would still be called homogeneous if the variations of chemical composition are small compared to the size of a written spot (typically 1-2 microns in diameter). A film will be considered inhomogeneous if it has a uniform variation of composition with depth in the film as shown in FIG. 2A or if there are horizontal variations occurring on a scale similar to the size of the radiated spot as shown in FIG. 2B. Further, a film will be considered inhomogeneous, in a relative sense, if, after treatment with sufficient energy, the coarseness of its variations in chemical composition increases to an extent sufficient to effect a change in optical density.

A method and structure for optical recording by laser-induced homogenization or fractionation which has no post-exposure development time is shown in FIG. 3. The optical recording structure 10 has a substrate 12 and a film 14 that contains a homogeneous mixture of a matrix material M and an incident energy-absorbing material A. Examples of matrix materials M include $SiO_2$, $TeO_2$, $GeO_2$, $MoO_2$, $Sb_2O_3$, $Bi_2O_3$, $In_2O_3$, TbO, $(CF_4)_n$, Selenium and mixtures thereof. Examples of absorbers A are Au, Ag, Pt, Pd, Ti, Cr, Cu, Te, Ge, Mn, Sb, Bi, Sn, In, Pb and mixtures thereof. The thickness of the film 14 is of the order of 500 Angstroms.

Figure 3A:
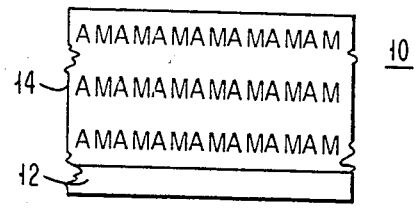
FIGS. 3A and 3B are cross-sectional views of a homogeneous mixture which is fractionated in accordance with this invention.
Figure 3B:
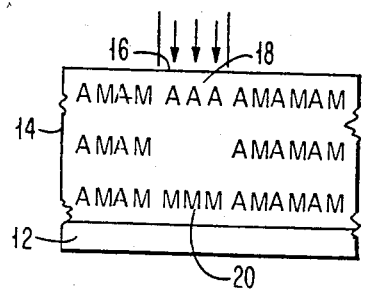

A spot 16 on the film 14 as shown in FIG. 3B is treated with sufficient energy in the form of electric fields, radiation or heat or combinations thereof, to effect fractionation of the film 14 into regions having the incident absorbing material A in one region 18 and the matrix material M in a second region 20. The fractionation of the matrix material and the absorbing material are done within a millisecond of the energy treatment and the film is thereafter stable against any other physical transformation, including amorphous to crystalline transformation. This eliminates the problem of post exposure development time. In FIGS. 3A and 3B writing is effected by fractionating the homogeneous film 14 to provide inhomogeneous regions 18 and 20 under spot 16.

The energy provided to the spot 16 on the film 14 is by an electrical field, radiation or heat or combinations thereof. In a preferred embodiment, the fractionation is effected by laser radiation. The laser radiation may be done with a short-duration laser pulse of 1 microsecond or less when the spot 16 is stationary. In another embodiment the laser irradiation step is done with a laser pulse duration of greater than 1 microsecond when the spot 16 is moving on said film 14. Examples of suitable lasers are Kr+, Ar+, GaAs, HeNe, $N_2$, Excimer, etc..

Figure 4A:
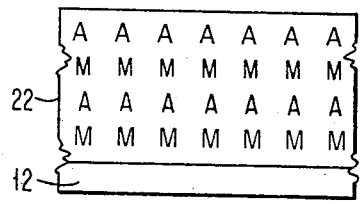
FIGS. 4A and 4B are cross-sectional views of an inhomogeneous mixture which is homogenized in accordance with another embodiment of this invention.
Figure 4B:
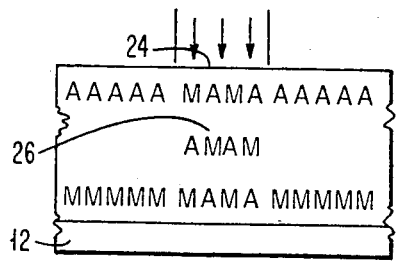

While the writing on the optical storage medium in FIGS. 3A and 3B was done by the fractionation of a homogeneous film, writing can also be effected as shown in FIGS. 4A and 4B by the homogenization of the inhomogeneous film 22. This is done by energizing spot 24, for example, with a laser, to form a homogeneous region 26 under the spot 24.

Writing may also be effected by converting an inhomogeneous film 22 such as shown in FIG. 4A, to a homogeneous film 14 such as shown in FIG. 3A by energy-activating and then in turn converting the homogeneous film 14 of 3A to the inhomogeneous regions 18 and 20 shown in FIG. 3B.

While the writing step involves the fractionation of a homogeneous sample or the homogenization of an inhomogeneous sample, erasure requires the opposite type of conversion step. That is, on a written film containing inhomogeneous regions on a homogeneous film, the erasing step involves homogenizing the inhomogeneous written region. Similarly, when the written film contains a homogeneous region on an inhomogenous film, the erasure involves the fractionation of the written homogeneous region.

Figure 5A:
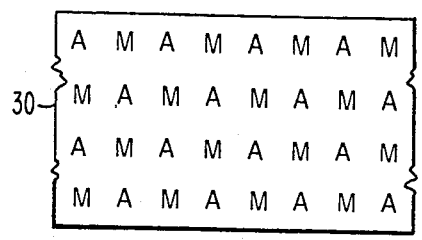
FIGS. 5A, 5B and 5C are top views of a homogeneous mixture which is fractionated with a different geometry in accordance with another embodiment of this invention.
Figure 5B:
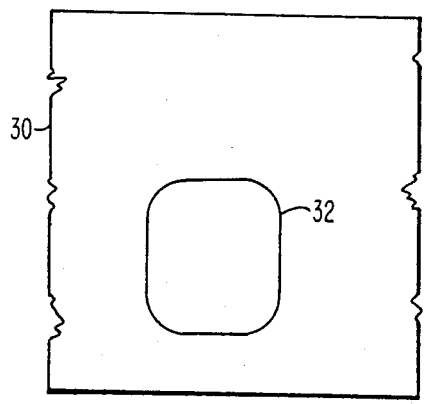
Figure 5C:
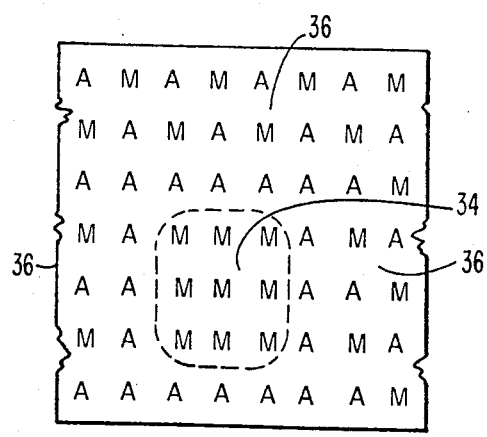

As shown in the top views given by FIGS. 5A, 5B and 5C, the homogeneous film 30 has a spot 32 which is energized by, for example, laser irradiation, to provide as shown in FIG. 5C a region 34 which is inhomogeneous and which is surrounded by a homogeneous region 36. The region 34 in this particular place is not a circular spot, but is an irregularly shaped spot for illustrative purposes.

The following examples demonstrate different embodiments in accordance with this invention.

EXAMPLES 1, 2 AND 3

(Prior Art)

Films containing 10 to 45 atomic percent $TeO_2$ as the matrix material and the remaining 90 to 55 atomic percent of Te as the absorber material were prepared on three different types of substrates by the codeposition of these materials onto glass substrates (Example 1), quartz substrates (Example 2), and polymethylmethacrylate (PMMA) substrates (Example 3). The thickness of the deposited films was chosen such that the reflectivity of the film was minimized at 830 nm, the wavelength where a reflectivity change was to be monitored by a GaAs-Laser. The film thickness was of the order of 0.1 $\mu$m. All films as deposited were amorphous and a homogeneous mixture of Te and $TeO_2$. These amorphous homogeneous films were exposed by an XeCl Excimer laser at a wavelength of 308 nm. One single 10 nsec pulse from said laser with an energy density at the film of 10–60 mJ/$cm^2$ effected fractionation and converted the amorphous homogeneous films into amorphous inhomogeneous films. The fractionation was determined by Electron Spectroscopy for Chemical Analysis (ESCA) and resulted in a substantial change in optical reflectivity from 20 to 30% to 25 to 35%. However, due to the use of tellurium as absorbing material all of these films underwent further changes in optical reflectivity to 40 to 50% during a 5 to 10 minute period after irradiation. These further changes were due to crystallization of tellurium as determined by x-ray diffraction analysis. These films exhibited post-exposure development and as a result were not suitable for high precision optical devices.

EXAMPLE 4

A film was prepared on a glass substrate by sequentially depositing layers of pure Te with a thickness of 5 nm and $TeO_2$ with a thickness of 1.7 nm. A total of 11 of these double layers was deposited resulting in a film containing a total of 20 atomic percent of $TeO_2$ as the matrix material and the remaining 80 atomic percent of Te as the absorber material. The total thickness of the deposited film was 74 nm. The film as deposited was crystalline and an inhomogeneous mixture of Te and $TeO_2$. This crystalline and inhomogeneous film was exposed by an XeCl Excimer laser at a wavelength of 308 nm. One single 10 nsec pulse from said laser with an energy density at the sample of 60 mJ/$cm^2$ effected homogenization and converted the crystalline inhomogeneous film into an amorphous homogeneous film. The homogenization was determined by ESCA and resulted in a substantial change in optical reflectivity. The optical reflectivity of the film at 830 nm was 50% before homogenization. The optical reflectivity of the film at 830 nm was 20% after homogenization. This optical reflectivity is stable and will not change unless acted upon by an additional energy input. As a result there is no post exposure development.

EXAMPLE 5

Films containing 77–50 weight percent Au as the absorber material A and 23–50 percent $TeO_2$ as the matrix material M were prepared by coevaporation of these materials onto glass substrates. The thickness of the deposited films was selected to be 60 nm in order to optimize their optical properties upon irradiation with either excimer or GaAlAs laser irradiation (20–60 $mJ/cm^2$). The optical reflectivity at 820 nm of these films was altered from 35–40% before exposure to 45–50% after exposure. Fractionation was determined by means of X-ray diffraction analysis and optical spectra recorded in the visible and infrared. Information recorded onto a rotating disk using this material could be read from its changes in optical reflectivity with a signal to noise ratio in excess of 45 db. The change in optical reflectivity was stable and showed no post exposure development.

EXAMPLES 6 AND 7

Example 5 was repeated on quartz substrates (Example 6) and on PMMA substrates (Example 7). In both cases the optical activity at 820 nm of these films was altered from 35 to 40% before exposure to 45 to 50% after exposure. The change in optical activity was stable and showed no post exposure development.

EXAMPLE 8

A multi-layered structure consisting of alternating $\int 2.0$ nm gold layers and 1.8–3.7 nm $TeO_2$ layers was formed through sequential deposition onto rotating glass and PMMA substrates. A total of 26 layers (13 each) were deposited. Excimer laser irradiation of these films with energies between 15–40 $mJ/cm^2$ resulted in a significant increase in optical reflectivity (from $\int 35\%$ to $\int 55\%$) without any evidence of ablation or microswelling. The increase in optical reflectivity indicates that the average Au particle size has significantly increased i.e. that fractionation has occurred in a manner similar to Example 3. Again, the change in optical reflectivity of the exposed region was found to be stable and exhibited no post exposure development.

As demonstrated by the previous examples, fractionation and/or homogenization of thin films provides an attractive technique for the storage of information. However, not all materials that fractionate during laser exposure are suitable for optical storage application. It is also required that the optical properties in the fractionated state be stable against further changes, and in particular not exhibit any post exposure development. It has been shown that through proper selection of materials this can be accomplished—a specific example being codeposited Au and $TeO_2$. In general, the selection of an absorber element that exhibits rapid crystallization upon solidification is sufficient to prevent the post exposure development problem.

While the invention has been particularly shown and described with reference to a preferred embodiment thereof, it will be understood by those skilled in the art that various other changes in the form and details may be made therein without departing from the spirit and scope of the invention.

We claim:

1. A method of information recording comprising the steps of
   providing a film of a mixture on a substrate, said mixture comprising a matrix material and an incident energy absorbing material which fractionates and/or homogenizes under treatment with sufficient energy, said mixture having a physical state after fractionation and/or homogenization which will undergo further physical state transformation only under treatment with additional energy,
   treating a spot on said film with sufficient energy to effect fractionation and/or homogenization of the film without ablation resulting in homogeneous and inhomogeneous regions whereby the physical changes caused by the fractionation and/or homogenization on said treated spot can be detected by the resulting changes in its physical properties,
   said matrix material being $SiO_2$, $TeO_2$, $GeO_2$, $MoO_2$, $Sb_2O_3$, $Bi_2O_3$, $In_2O_3$, TbO, $(CF_4)_n$, Se or a mixture thereof, and
   said energy absorbing material being Au, Ag, Pt, Pd, Ti, Cr, Cu, Te, Ge, Mn, Sb, Bi, Sn, In, Pb or a mixture thereof.

2. A method as described in claim 1 whereby the spot is irradiated with a laser.

3. A method as described in claim 2 whereby the laser irradiation step is done with a short duration laser pulse of 1 microsecond or less on a stationary spot on said film.

4. A method as described in claim 2 whereby the laser irradiation step is done with a laser pulse duration of greater than 1 microsecond on a moving spot on said film.

5. A method as described in claim 2 including the step of heating said film before it is irradiated.

6. A method as described in claim 2 including the step of heating said film while it is being irradiated.

7. A method as described in claim 2 including a second irradiation step.

8. A method as described in claim 9 including a third irradiation step to introduce new data.

9. A method as described in claim 1 whereby said film is of a homogeneous mixture which fractionates.

10. A method as described in claim 9 whereby said homogeneous mixture is obtained by treating a film of a inhomogeneous mixture.

11. A method as described in claim 1 whereby said film is of a inhomogeneous mixture which homogenizes.

12. An optical recording structure comprising a film of a mixture on a substrate, said mixture comprising a matrix material and an incident energy absorbing material which mixture has been fractionated and/or homogenized without ablation as a result of treatment with sufficient energy, said mixture having a physical state which after such fractionation and/or homogenization will undergo further physical state transformation without ablation when treated with additional energy,
   said matrix material being taken from the group consisting of $SiO_2$, $TeO_2$, $GeO_2$, $MoO_2$, $Sb_2O_3$, $Bi_2O_3$, $In_2O_3$, TbO, $(CF_4)_n$, Se or a mixture thereof, and
   said incident energy absorbing material being taken from the group consisting of Au, Ag, Pt, Pd, Ti, Cr, Cu, Te, Ge, Mn, Sb, Bi, Sn, In, Pb or a mixture thereof.

13. An optical recording structure comprising a film of a mixture on a substrate, said mixture comprising a matrix material and an incident energy absorbing material, said matrix material being taken from the group consisting of $SiO_2$, $TeO_2$, $GeO_2$, $MoO_2$, $Sb_2O_3$, $Bi_2O_3$, $In_2O_3$, TbO, $(CF_4)_n$, Se or a mixture thereof, said incident energy absorbing material being taken from the group consisting of Au, Ag, Pt, Pd, Ti, Cr, Cu, Te, Ge, Mn, Sb, Bi, Sn, In, Pb or a mixture thereof, which mixture has been fractionated and/or homogenized without ablation as a result of treatment with sufficient energy, whereby an optical difference results between the areas where the energy absorbent material has been moved internally of the recording structure and the areas where the energy absorbent material remains unmoved.

* * * * *